United States Patent
Fukui et al.

(10) Patent No.: US 12,391,238 B2
(45) Date of Patent: Aug. 19, 2025

(54) COLLISION AVOIDANCE SUPPORT DEVICE FOR A VEHICLE AND COLLISION AVOIDANCE SUPPORT PROGRAM FOR A VEHICLE

(71) Applicant: TOYOTA JIDOSHA KABUSHIKI KAISHA, Toyota (JP)

(72) Inventors: Yusuke Fukui, Toyota (JP); Yuzo Kaneshige, Toyota (JP); Takashi Moriya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 17/897,332

(22) Filed: Aug. 29, 2022

(65) Prior Publication Data
US 2023/0063729 A1    Mar. 2, 2023

(30) Foreign Application Priority Data
Aug. 31, 2021  (JP) ................. 2021-141616

(51) Int. Cl.
*B60W 30/09* (2012.01)
*B60W 30/095* (2012.01)
*B60W 40/105* (2012.01)

(52) U.S. Cl.
CPC ........ *B60W 30/09* (2013.01); *B60W 30/0953* (2013.01); *B60W 40/105* (2013.01);
(Continued)

(58) Field of Classification Search
CPC .. G05D 1/0061; G05D 1/0223; G05D 1/0088; G05D 1/0214; G05D 1/021;
(Continued)

(56) References Cited

U.S. PATENT DOCUMENTS 8,845,492 B2 *  9/2014  Seifer ............. B60W 30/18109
                                                                477/186
9,105,190 B2    8/2015  Akiyama
(Continued)

FOREIGN PATENT DOCUMENTS

JP   2007210594 A  *  8/2007
JP   2009262698 A  *  11/2009
(Continued)

OTHER PUBLICATIONS

Espacenet Machine Translation of JP2009262698A (Year: 2009) (Year: 2009).*

(Continued)

*Primary Examiner* — Kito R Robinson
*Assistant Examiner* — Zachary E. F. Glade
(74) *Attorney, Agent, or Firm* — Dinsmore & Shohl LLP

(57) ABSTRACT

A collision avoidance support device for a vehicle that includes an obstacle detection device for detecting an obstacle in front of the vehicle and an electronic control unit configured to perform automatic brake control that automatically applies braking force to a vehicle when it is determined that the obstacle detection device have detected an obstacle and the vehicle may collide with the obstacle, and the electronic control unit is configured to prohibit the automatic brake control when it is determined that the vehicle is not towing a trailer and a turning index value indicating a degree of turning of the vehicle is equal to or larger than a first reference value, and prohibit the automatic brake control when it is determined that the vehicle is towing a trailer and the turning index value is equal to or larger than a second reference value smaller than the first reference value.

7 Claims, 10 Drawing Sheets

(52) U.S. Cl.
CPC ... *B60W 2520/14* (2013.01); *B60W 2530/203* (2020.02); *B60W 2540/18* (2013.01)

(58) Field of Classification Search
CPC ............ G05D 1/0221; B60W 30/165; B60W 30/00–2030/206; B60W 40/00–2040/1392; B60W 2520/00–2520/406; B60W 2530/201–2530/213; B60W 30/12; B60W 30/16; B60W 30/162; B60W 30/17; B60W 30/182; B60W 50/082; B60W 2540/06–2540/20; B60K 28/00–28/165
See application file for complete search history.

(56) References Cited

U.S. PATENT DOCUMENTS

| | | | |
|---|---|---|---|
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 | 10/2020 | Kaminade et al. | |
| 2008/0015754 A1* | 1/2008 | Hac | B62D 6/003 |
| | | | 701/1 |
| 2009/0306861 A1* | 12/2009 | Schumann | B60T 8/17552 |
| | | | 303/123 |
| 2010/0241319 A1* | 9/2010 | Choby | B60T 7/20 |
| | | | 701/70 |
| 2016/0159225 A1* | 6/2016 | Nakatsu | B60L 15/2009 |
| | | | 701/70 |
| 2017/0235307 A1* | 8/2017 | Asakura | G05D 1/0061 |
| | | | 701/23 |
| 2017/0358209 A1* | 12/2017 | Ohmori | B60W 30/08 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2021/0155232 A1 | 5/2021 | Ike et al. | |
| 2023/0219566 A1* | 7/2023 | Fukui | B60W 30/0956 |
| | | | 701/301 |

FOREIGN PATENT DOCUMENTS

| | | |
|---|---|---|
| JP | 2017-146653 A | 8/2017 |
| JP | 2019-142408 A | 8/2019 |
| JP | 2021-079904 A | 5/2021 |

OTHER PUBLICATIONS

Espacenet Machine Translation of JP2007210594A (Year: 2007).*
Espacenet Machine Translation of JP2009262698A (Year: 2009).*

* cited by examiner

COLLISION AVOIDANCE SUPPORT DEVICE FOR A VEHICLE AND COLLISION AVOIDANCE SUPPORT PROGRAM FOR A VEHICLE

CROSS-REFERENCE TO RELATED APPLICATION

This application claims priority to Japanese Patent Application No. JP2021-141616 filed on Aug. 31, 2021, the content of which is hereby incorporated by reference in its entirety into this application.

BACKGROUND

1. Technical Field

The present disclosure relates to a collision avoidance support device for a vehicle and a collision avoidance support program for a vehicle.

2. Description of the Related Art

A collision avoidance support device is known as one of driving support devices for vehicles such as automobiles. The collision avoidance support device warns a driver when an obstacle that may cause a collision is detected in front of a vehicle, and when the possibility of collision becomes higher, the collision avoidance support device executes collision avoidance support control to prevent the vehicle from colliding with the obstacle by automatic brake control.

Even in a vehicle equipped with a collision avoidance support device, a driver may perform steering operations to avoid a collision with an obstacle, in which case automatic brake control needs to be restricted so that the driver's driving is prioritized. For example, Japanese Patent Application Laid-Open No. 2021-079904 describes a collision avoidance support control in which automatic brake is prohibited as steer override when a steering angle or steering angular velocity is equal to or higher than a corresponding threshold value.

A vehicle such as an automobile may tow a trailer, and even in a situation where a vehicle is towing a trailer, if there is an obstacle in front of the vehicle that may cause a collision, it is conceivable to execute collision avoidance support control so that the vehicle can avoid colliding with the obstacle.

However, in a situation where a vehicle is towing a trailer, if the vehicle is suddenly decelerated by automatic brake control by collision avoidance support control, the vehicle is pushed from behind by the trailer, and a jackknifing phenomenon may occur in which a crossing angle of longitudinal centerlines of the vehicle and the trailer becomes excessive.

The jackknifing phenomenon also may occur at a stage where a steering angle and a steering angular velocity are smaller than corresponding threshold values of steer override. Therefore, when collision avoidance support control is performed in a situation where a vehicle is towing a trailer, even if automatic brake is prohibited when a steering angle or steering angular velocity is equal to or higher than the corresponding threshold value of steer override, the jackknifing phenomenon cannot be prevented from occurring.

SUMMARY

The present disclosure provides a collision avoidance support device and a collision avoidance support program improved so that a jackknifing phenomenon does not occur due to an automatic brake control by a collision avoidance support control in a situation where a vehicle is towing a trailer.

According to the present disclosure, a collision avoidance support device for a vehicle is provided, including an obstacle detection device that detects an obstacle in front of a vehicle and an electronic control unit configured to perform automatic brake control to apply braking force automatically to the vehicle when it is determined that an obstacle is detected by the obstacle detection device and the vehicle may collide with the obstacle.

The electronic control unit is configured to prohibit the automatic brake control when it is determined that the vehicle is not towing a trader and a turning index value indicating a degree of turning of the vehicle is equal to or higher than a first reference value, and prohibit the automatic brake control when it is determined that the vehicle is towing a trader and the turning index value is equal to or larger than a second reference value smaller than the first reference value.

According to the present disclosure, a collision avoidance support program for a vehicle is provided that causes an electronic control unit mounted on a vehicle to execute a step of detecting an obstacle in front of the vehicle by an obstacle detection device and a step of performing automatic brake control that automatically applies braking force to the vehicle when it is determined that an obstacle is detected by the obstacle detection device and the vehicle may collide with the obstacle.

The collision avoidance support program includes a step of determining whether the vehicle is towing a trailer, a step of prohibiting the automatic brake control when it is determined that the vehicle is not towing a trailer and a turning index value indicating a degree of turning of the vehicle is equal to or larger than a first reference value, and a step of prohibiting the automatic brake control when it is determined that the vehicle is towing a trailer and the turning index value is equal to or larger than a second reference value smaller than the first reference value.

When a vehicle is towing a trailer, the larger the turning index value, the larger a hitch angle, that is, a crossing angle of longitudinal center lines of the vehicle and the trailer when viewed from above, and the larger the hitch angle, the larger the possibility that a jackknifing phenomenon is likely to occur due to the automatic brake control by the collision avoidance support control. Therefore, in order to effectively prevent an occurrence of the jackknifing phenomenon, in embodiments, automatic brake control is prohibited at a stage where the hitch angle is small, in other words, when the turning index value is small.

According to the above-mentioned collision avoidance support device and collision avoidance support program, in a situation where the vehicle is not towing a trailer, the automatic brake control is prohibited when it is determined that the turning index value indicating the degree of turning of the vehicle is equal to or larger than the first reference value. On the other hand, in a situation where the vehicle is towing a trailer, the automatic brake control is prohibited when it is determined that the turning index value is equal to or larger than a second reference value, and the second reference value is smaller than the first reference value. Therefore, it is possible to effectively prevent the jackknifing phenomenon from occurring due to the automatic brake control as compared to where the automatic brake control is prohibited when it is determined that the turning index value is equal to or higher than the first reference value in a situation where the vehicle is towing a trailer.

In one aspect of the present disclosure, the electronic control unit is configured to continue the prohibition of the automatic brake control until a predetermined time elapses from a time point when it is determined that the turning index value becomes equal to or smaller than a third reference value smaller than the second reference value from a value larger than the third reference value, and release the prohibition of the automatic brake control after the predetermined time has elapsed from the above time point.

When a vehicle tows a trailer and turns, the trailer continues to turn for a while even if the vehicle finishes turning, and a hitch angle does not become zero. Therefore, in embodiments the prohibition of the automatic brake control is continued for a while even if the turning index value becomes small.

According to the above aspect, the prohibition of the automatic brake control is continued until a predetermined time elapses from a time point when it is determined that the turning index value becomes equal to or smaller than a third reference value smaller than the second reference value from a value larger than the third reference value, and the prohibition of the automatic brake control is released after the predetermined time has elapsed from the above time point. Therefore, in a situation where the vehicle has finished turning but the trailer is in a turning state, it is possible to prevent the jackknifing phenomenon from occurring due to the automatic brake control.

In another aspect of the present disclosure, the electronic control unit is configured to variably set the predetermined time according to a vehicle speed so that the higher the vehicle speed, the shorter the predetermined time.

The higher a vehicle speed, the shorter a time for a trailer to continue turning even after a vehicle finishes turning. Therefore, in embodiments the predetermined time is variably set according to the vehicle speed so that the higher the vehicle speed, the shorter the predetermined time.

According to the above aspect, the predetermined time is variably set according to a vehicle speed so that the higher the vehicle speed, the shorter the predetermined time. Therefore, the prohibition of the automatic brake control can be prevented from being continued unnecessarily long when a vehicle speed is high, while preventing the automatic brake control from being restarted in spite the trailer is in a turning state when the vehicle speed is low.

Further, hi another aspect of the present disclosure, the turning index value is a steering angle.

According to the above aspect, since the turning index value is a steering angle, it is possible to control the prohibition of the automatic brake control based on a steering angle detected as a steering operation amount of a driver.

Further, in another aspect of the present disclosure, the turning index value is a yaw rate of the vehicle.

According to the above aspect, it is possible to control the prohibition of the automatic brake control based on a yaw rate of the vehicle detected as one of turning state quantities of the vehicle.

Further, in another aspect of the present disclosure, the turning index value is a product of a yaw rate of the vehicle and a vehicle speed.

According to the above aspect, it is possible to control the prohibition of the automatic brake control based on a product of a vehicle speed of the vehicle and a yaw rate detected as one of turning state quantities of the vehicle, that is, an estimated lateral acceleration of the vehicle.

Further, in another aspect of the present disclosure, the turning index value is a steering angle, and the electronic control unit is configured to continue the prohibition of the automatic brake control until a predetermined time elapses from a time point when it is determined that a condition that an absolute value of a steering angle is smaller than or equal to the third reference value smaller than the second reference value and an absolute value of a time derivative of the steering angle is smaller than or equal to a reference value of the time derivative is satisfied, and release the prohibition of the automatic brake control after the predetermined time has elapsed from the above time point.

According to the above aspect, the prohibition of the automatic brake control is continued until a predetermined time elapses from a time point when it is determined that the above condition is satisfied, and the prohibition of the automatic brake control is released after the predetermined time has elapsed from the above time point.

The absolute value of the time derivative of the steering angle generally becomes equal to or smaller than the reference value of the time derivative after the absolute value of the steering angle becomes equal to or smaller than the third reference value. Therefore, according to the above aspect, as compared to where a time derivative value of a steering angle is not taken into consideration, it is possible to continue the prohibition of the automatic brake control for a longer time, and reduce the possibility that the prohibition of the automatic brake control is released before a trailer goes straight.

Further, according to the above aspect, the prohibition of the automatic brake control can be continued not only when the turning of the vehicle is completed but also when the vehicle changes lanes and an absolute value of a steering angle becomes equal to or smaller than the third reference value during the lane change. Therefore, when the vehicle changes lanes, it is possible to reduce the possibility that the jackknifing phenomenon occurs due to the automatic brake control.

In the present application, the "degree of turning of a vehicle" is determined to be higher as a turning radius of the vehicle is smaller and higher as a vehicle speed is higher. The turning radius of the vehicle is smaller as an absolute value of a steering angle is larger, and is smaller as an absolute value of a yaw rate of the vehicle is larger.

Other objects, other features and attendant advantages of the present disclosure will be readily understood from the description of the embodiments of the present disclosure described with reference to the following drawings.

DETAILED DESCRIPTION

The embodiment of the present disclosure will now be described in detail with reference to the accompanying drawings.

[Embodiment]

Figure 1:
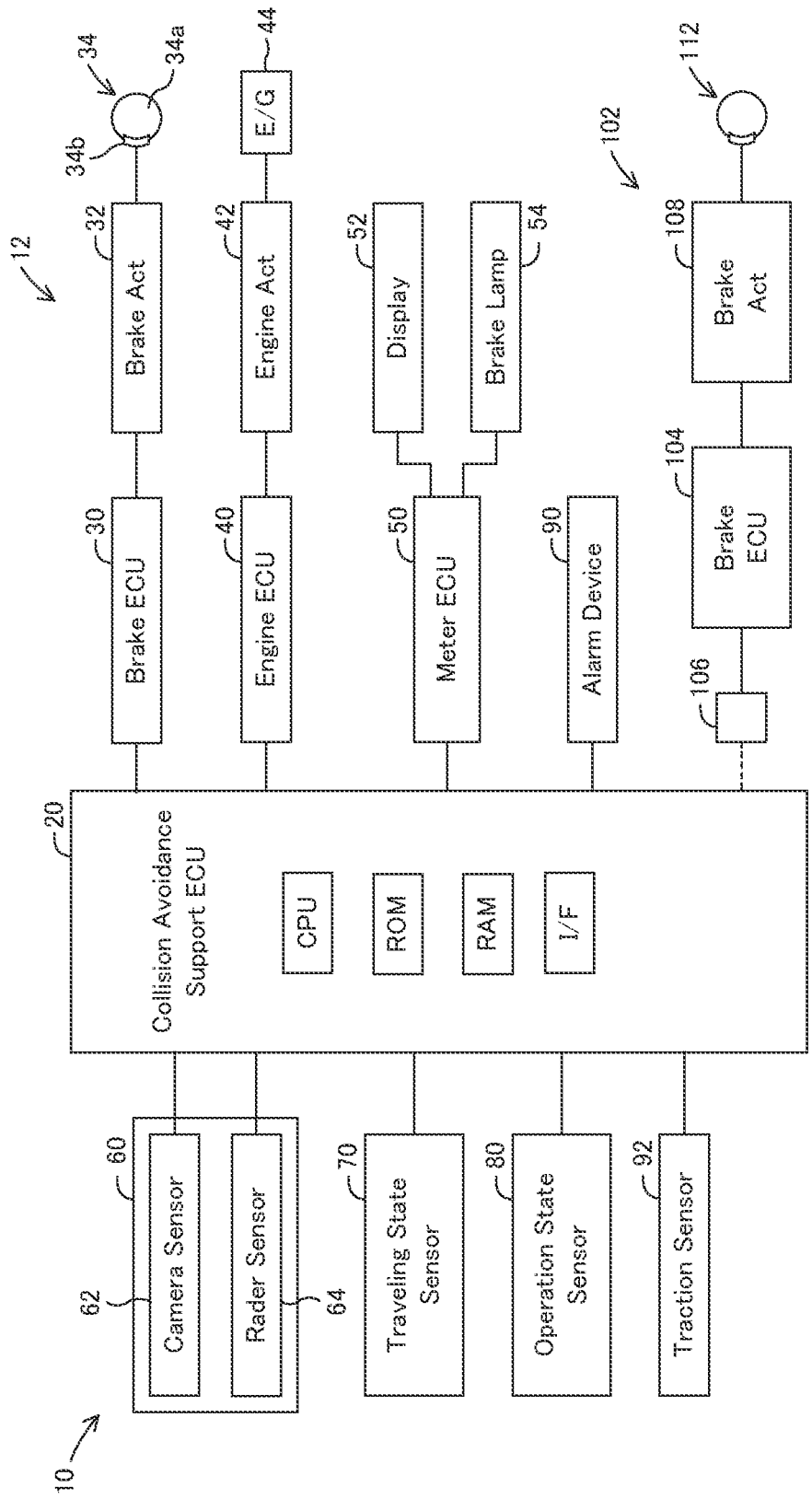
FIG. 1 is a schematic configuration diagram showing an embodiment of a vehicle collision avoidance support device for a vehicle according to the present disclosure.

As shown in FIG. 1, the vehicle collision avoidance support device 10 according to the embodiment is adapted to a vehicle 12 (referred to as "own vehicle" as necessary to distinguish it from other vehicles). The collision avoidance support device 10 includes a collision avoidance support ECU 20 and a brake ECU 30, and the vehicle 12 includes an engine ECU 40 and a meter ECU 50.

These ECUs are electronic control units each having a microcomputer as a main part, and are connected to each other so as to be able to transmit and receive information via a CAN (Controller Area Network) (not shown). Although not shown in FIG. 1, the microcomputer includes a CPU, a ROM, a RAM, a non-volatile memory, an interface I/F, and the like. Each CPU realizes various functions by executing instructions (programs, routines) stored in the ROM. Some or all of these ECUs may be integrated into one ECU.

The collision avoidance support ECU 20 gives an alarm to a driver when an obstacle is detected in front of the own vehicle, and executes collision avoidance support control to prevent the own vehicle from colliding with the obstacle by automatic brake control when the possibility of collision becomes higher. Since the collision avoidance support control is generally called PCS control (pre-crash safety control), the collision avoidance support control is hereinafter called PCS control.

An obstacle detection device 60, a traveling state sensor 70, an operation state sensor 80, an alarm device 90, and a traction sensor 92 are connected to the collision avoidance support ECU 20. In the embodiment, the obstacle detection device 60 and the like are connected to the collision avoidance support ECU 20, but at least one of them may be connected to the CAN. The alarm device 90 may be any of an alarm device that issues a visual alarm such as an alarm lamp, an alarm device that issues an auditory alarm such as an alarm buzzer, and an alarm device that issues a bodily alarm such as vibration of a seat, and may be any combination thereof.

In the present embodiment, the obstacle detection device 60 includes a camera sensor 62 and a radar sensor 64. The camera sensor 62 is arranged in the upper part of the front window in a vehicle interior, and captures scenery in front of the vehicle 12. The camera sensor 62 recognizes a white line on a road and a three-dimensional object existing in front of the vehicle 12 based on the captured image, and supplies the information (white line information, three-dimensional object information) to the collision avoidance support ECU 20 at a predetermined cycle. The white line information is information indicating a shape of the white line and a relative positional relationship between the vehicle 12 and the white line. The three-dimensional object information is information indicating a type of the three-dimensional object detected in front of the vehicle 12, a size of the three-dimensional object, a relative positional relationship of the three-dimensional object with respect to the vehicle, and the like. The recognition of the type of a three-dimensional object is realized by machine learning such as pattern matching, for example.

The radar sensor 64 is provided in the center of the front of a vehicle body and detects a three-dimensional object existing in the front region of the vehicle 12. The radar sensor 64 emits radio waves in the millimeter wave band (hereinafter referred to as "millimeter wave") and receives millimeter waves (that is, reflected waves) reflected by a three-dimensional object (for example, another vehicle, pedestrian, bicycle, building, etc.) existing in a radiation range. The radar sensor 64 calculates a distance between the vehicle 12 and a three-dimensional object, a relative speed of the vehicle with respect to the three-dimensional object, a relative position (direction) of the three-dimensional object with respect to the vehicle, and the like based on a phase difference between the transmitted millimeter wave and the received reflected wave, an attenuation level of the reflected wave, a time from the transmission of the millimeter wave to the reception of the reflected wave, and the like, and supplies information (three-dimensional object information) representing calculation results to the collision avoidance support ECU 20 at a predetermined cycle.

The collision avoidance support ECU 20 synthesizes the three-dimensional object information supplied from the camera sensor 62 and the three-dimensional object information supplied from the radar sensor 64 to acquire highly accurate three-dimensional object information. Therefore, the camera sensor 62 and the radar sensor 64 function as an obstacle detection device 60 for detecting an obstacle in front of the vehicle 12.

The traveling state sensor 70 is, for example, a wheel speed sensor that detects a wheel speed of each wheel of the vehicle 12, a longitudinal acceleration sensor that detects a longitudinal acceleration of the vehicle, a lateral acceleration sensor that detects a lateral acceleration of the vehicle, and a yaw rate sensor that detects a yaw rate Yr of the vehicle. The yaw rate Yr becomes a positive value when the vehicle 12 turns to the left.

The operation state sensor 80 is a sensor and a switch for detecting an operation performed by the driver. Although not shown in FIG. 1, the operation state sensor 80 includes an accelerator operation amount sensor that detects an amount of depression of an accelerator pedal (accelerator opening), and a brake operation amount sensor that detects a depression force on a brake pedal or a master cylinder pressure. Further, the operation state sensor 80 includes a steering angle sensor that detects a steering angle θ corresponding to a steering operation amount, a steering torque sensor that detects a steering torque, a blinker switch that detects an operating state of a blinker, and a shift position sensor that detects a shift position of a transmission and the like. The steering angle θ becomes a positive value when the vehicle 12 turns to the left.

Figure 2:
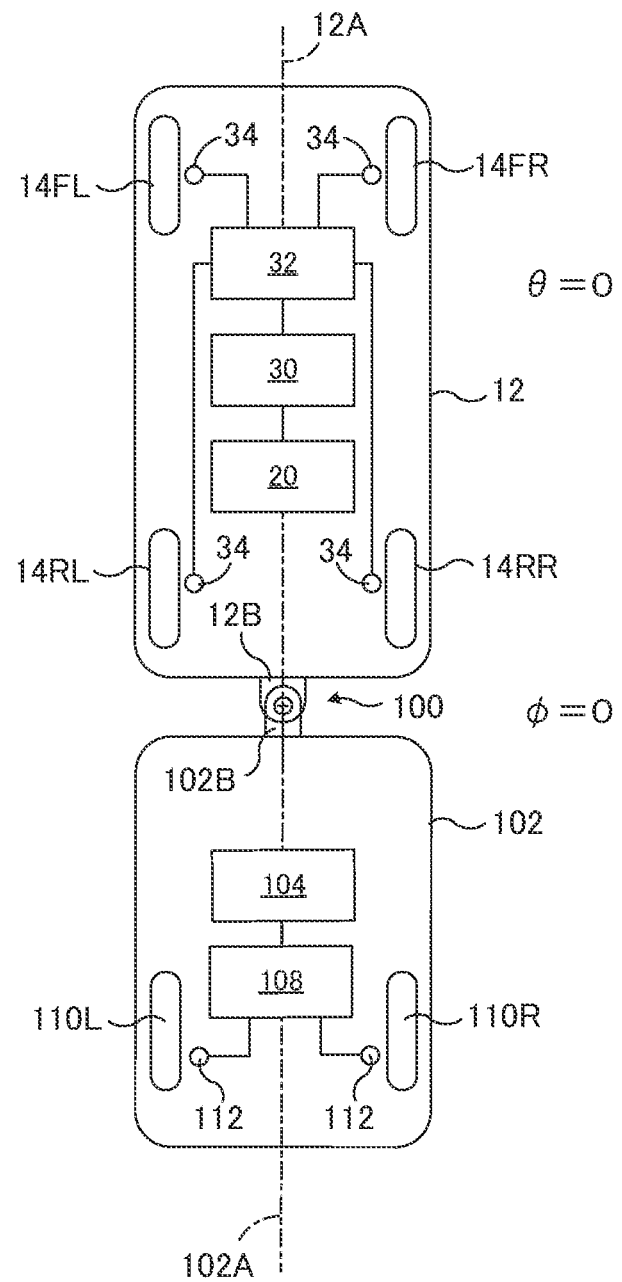
FIG. 2 is a diagram showing a situation in which a vehicle is towing a trailer and traveling straight.
Figure 3:
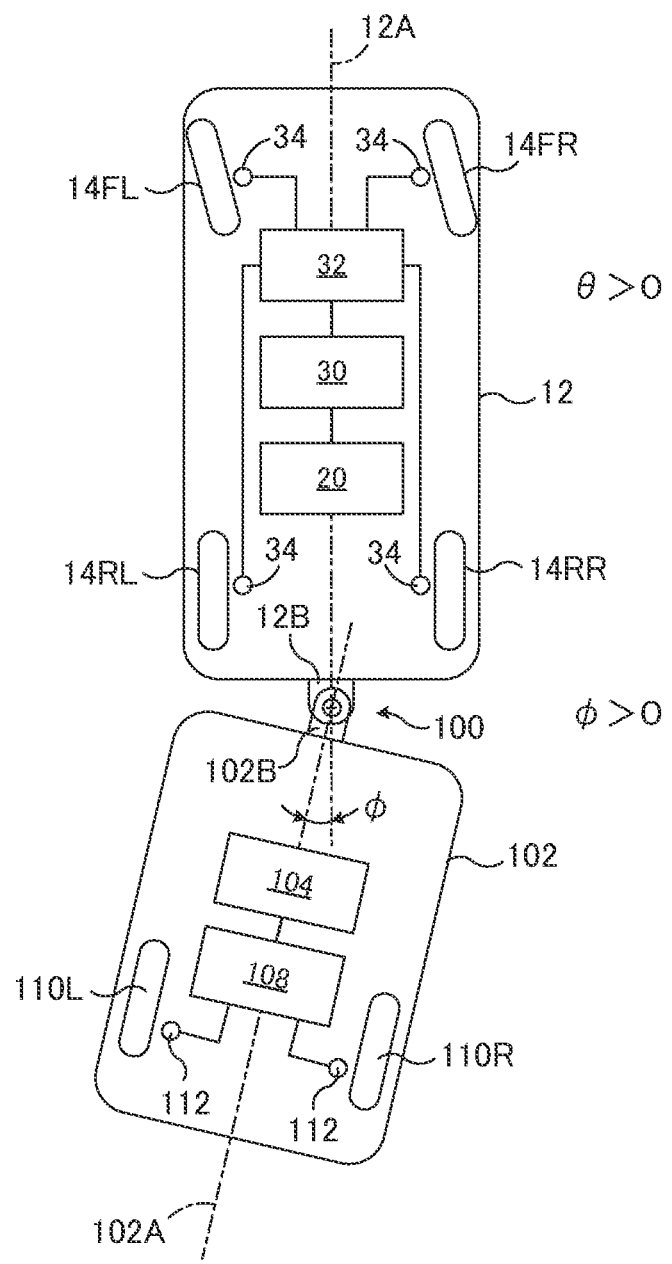
FIG. 3 is a diagram showing a situation in which a vehicle is towing a trailer and turning.
Figure 4:
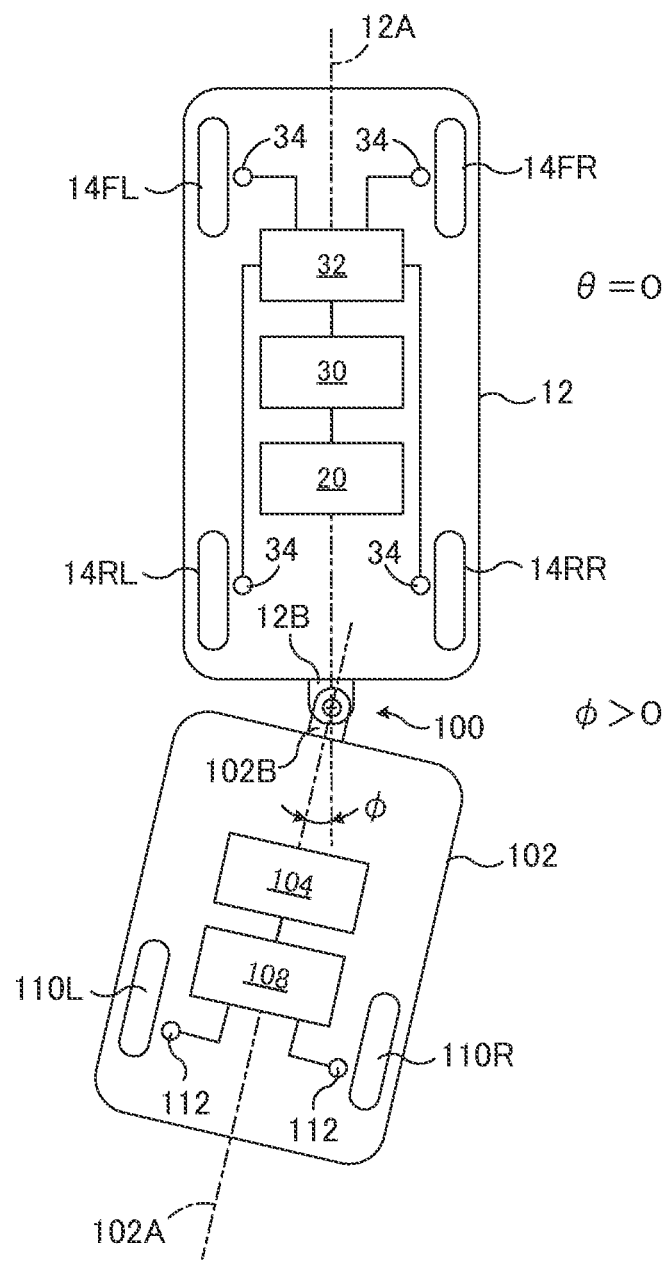
FIG. 4 is a diagram showing a situation in which a vehicle tows a trailer and finishes turning.

As shown in FIGS. 2 to 4, a front end bracket 102B of a trailer 102 can be connected to a rear end bracket 12B of the vehicle 12 by a joint 100. Therefore, the vehicle 12 functions as a tractor for towing the trailer 102 as needed. In FIGS. 2 to 4, a hitch angle φ, that is, an intersection angle of longitudinal center lines 12A and 102A of the vehicle 12 and the trailer 102 seen from above is shown. The hitch angle φ becomes a positive value when the vehicle 12 turns to the left.

As shown in FIG. 2, when the vehicle 12 and the trailer 102 are in the straight-ahead state, the longitudinal center line 12A of the vehicle 12 and the longitudinal center line 102A of the trailer 102 are aligned with each other, and a center of the joint 100 is located on these longitudinal centerlines. On the other hand, as shown in FIG. 3, when the vehicle 12 and the trailer 102 are in a turning state, the longitudinal center line 12A of the vehicle 12 and the longitudinal center line 102A of the trailer 102 intersect each other and the center of the joint 100 is located on an intersection of these longitudinal centerlines.

A brake ECU 104 is mounted on the trailer 102, and a brake ECU 104 is configured to be electrically connected to the collision avoidance support ECU 20 via a connector 106 and the CAN (not shown) as shown in FIG. 1. The traction sensor 92 may be a switch that turns on when the collision avoidance support ECU 20 and the brake ECU 104 are electrically connected by the connector 106.

Information (referred to as sensor information) detected by the traveling state sensor 70, the operation state sensor 80, and the traction sensor 92 is supplied to the collision avoidance support ECU 20 at a predetermined cycle via the CAN (not shown).

A brake actuator 32 is connected to the brake ECU 30. The brake actuator 32 is provided in the hydraulic circuit between a master cylinder (not shown) that pressurizes hydraulic oil by a pedaling force applied to a brake pedal (not shown) and friction brake mechanisms 34 provided on the left and right front wheels 14FL and 14FR and the left and right rear wheels 14RL and 14RR. Each friction brake mechanism 34 includes a brake disc 34a that rotates with the corresponding wheel and a brake caliper 34b supported by a vehicle body (not shown). The brake actuator 32 adjusts a hydraulic pressure supplied to a wheel cylinder built in each brake caliper 34b in response to an instruction from the brake ECU 30, and the hydraulic pressure presses brake pads (not shown) against the brake disc 34a to generate a frictional braking force.

The brake ECU 30 calculates a driver-required deceleration based on a pedal effort or a master cylinder pressure detected by the brake operation amount sensor, and controls the operation of the brake actuator 32 so that the vehicle 12 decelerates at the driver-required deceleration. Further, when the brake ECU 30 receives a PCS brake command from the collision avoidance support ECU 20, the brake ECU 30 controls the operation of the brake actuator 32 so that the vehicle 12 decelerates at a PCS required deceleration which is an information included in the PCS brake command.

When the brake pedal is operated by the driver in a situation where the brake ECU 30 is receiving the PCS brake command, the brake ECU 30 adopts a required deceleration having a larger absolute value among the driver-required deceleration and the PCS-required deceleration as a final required deceleration. The brake ECU 30 controls the operation of the brake actuator 32 so that the vehicle 12 decelerates at the final required deceleration. That is, the brake ECU 30 executes a brake override control.

The brake ECU 30 performs anti-skid control (hereinafter referred to as "ABS control") in a manner known in the art. That is, the brake ECU 30 calculates braking slip rates of the wheels based on the wheel speeds Vwi (i=fl, fr, rl and rr) of the left and right front wheels 14FL and 14FR and the left and right rear wheels 14RL and 14RR detected by the wheel speed sensors included in the traveling state sensor 70. Further, when the braking slip ratio of any of the wheels exceeds a control start reference value, the brake ECU 30 controls the braking force of the wheel so that the braking slip ratio of the wheel is within a predetermined range until a preset control end condition is satisfied.

A brake actuator 108 is connected to the brake ECU 104. The brake actuator 108 is provided in a hydraulic circuit between a hydraulic source (not shown) for supplying high-pressure hydraulic oil and friction brake mechanisms 112 provided on a left wheel 110L and a right wheel 110R. Each friction brake mechanism 112 is configured in the same manner as the friction brake mechanism 34, and is controlled by the brake ECU 104 so that a frictional braking force corresponding to the driver required deceleration or the PCS required deceleration is generated.

An engine actuator 42 is connected to the engine ECU 40. The engine actuator 42 is an actuator for changing an operating state of an engine 44 (internal combustion engine), and includes, for example, a throttle valve actuator for changing an opening degree of a throttle valve. The engine ECU 40 calculates a driver-required driving force based on an amount of depression of an accelerator pedal detected by an accelerator operation amount sensor, and controls an operation of the engine actuator 42 so that a driving force (actual driving force) of the vehicle 12 approaches the driver-required driving force.

When the engine ECU 40 receives a driving force limiting command from the collision avoidance support ECU 20, the engine ECU controls the operation of the engine actuator 42 so as to suppress an output torque (driving force of the vehicle 12) generated by the engine 44. Notably, when the vehicle is an electric vehicle, the engine actuator 42 is a drive device for an electric motor, and when the vehicle is a hybrid vehicle, the engine actuator 42 is a drive device for an engine actuator and an electric motor.

A display 52 and a brake lamp 54 are connected to the meter ECU 50. The meter ECU 50 displays information related to the collision avoidance support on the display 52 according to the display command from the collision avoidance support ECU 20. The display 52 may be, for example, a head-up display or a multi-information display for displaying meters and various information.

<PCS Control>

Next, PCS control will be described. The collision avoidance support ECU 20 determines the possibility that the own vehicle 12 collides with a three-dimensional object in front of the vehicle based on the information about the three-dimensional object supplied from the obstacle detection device 60 and a vehicle state detected by the traveling state sensor 70. For example, the collision avoidance support ECU 20 determines if there is a possibility of collision with a three-dimensional object when the object maintains a current moving state (when the three-dimensional object is a stationary object, a stopped state) and the own vehicle maintains a current running state. When the collision avoidance support ECU 20 determines that the own vehicle may collide with the three-dimensional object, the collision avoidance support ECU recognizes the three-dimensional object as an obstacle.

When the collision avoidance support ECU 20 detects an obstacle, the collision avoidance support ECU calculates a collision prediction time TTC, which is a predicted time until the own vehicle 12 collides with the obstacle. The collision prediction time TTC is calculated by the following equation (1) based on a distance Dr between the obstacle and the own vehicle and a relative speed Vr of the own vehicle with respect to the obstacle. The collision prediction time TTC is an index showing a high possibility that the own vehicle collides with an obstacle, and the smaller the value, the higher the possibility (risk) that the own vehicle collides with the obstacle.

$$TTC=Dr/Vr \quad (1)$$

In the PCS control of the present embodiment, a level of possibility that the own vehicle 12 collides with an obstacle is divided into two stages based on the collision prediction time TTC. When the collision prediction time TTC drops below a warning threshold TTCw (a positive constant), the collision avoidance support ECU 20 determines that the level of the possibility that the own vehicle collides with the obstacle has reached a first stage, and uses the display 52 and the alarm device 90 to give alarms to a driver.

When the collision prediction time TTC further decreases and becomes equal to or smaller than an operating threshold TTCa (a positive constant smaller than TTCw), the collision avoidance support ECU 20 determines that the level of the possibility that the own vehicle 12 collides with the obstacle has reached a second stage, and starts an automatic brake control. In this connection, the collision avoidance support ECU 20 transmits a PCS brake command to the brake ECU 30. The PCS brake command contains information representing a PCS required deceleration Gpcs.

The PCS request deceleration Gpcs is calculated as follows. For example, taking a case where an obstacle is stopped, and representing a speed (=relative speed) of the own vehicle at a present time by V, a deceleration of the own vehicle by Gb (<0), and a time until the own vehicle stops by t, a mileage X until the own vehicle stops can be expressed by the following equation (2).

$$X=V \cdot t - (\tfrac{1}{2}) Gb \cdot t^2 \quad (2)$$

Further, the time t until the own vehicle stops can be expressed by the following equation (3).

$$t=-V/Gb \quad (3)$$

Therefore, by substituting the time t represented by the equation (3) into the time t of the equation (2), the mileage X until the own vehicle stops can be expressed by the following equation (4).

$$X=-V^2/(2Gb) \quad (4)$$

In order to stop the vehicle in front of the obstacle by a distance β, the deceleration Gb may be calculated by setting the mileage X to a distance (Ds−β) obtained by subtracting the distance β (>0) from a distance Ds detected by the obstacle detection device 60. Notably, when an obstacle is traveling, the mileage X may be calculated using a relative speed and a relative deceleration with the obstacle.

The PCS required deceleration Gpcs is set to a sign inversion value of the deceleration Gb calculated in the above way. An upper limit value Gmax (>0) is set for the PCS request deceleration Gpcs, and if the calculated magnitude (absolute value) of the PCS request deceleration Gpcs exceeds the upper limit value Gmax, the magnitude of the deceleration Gpcs is set to the upper limit Gmax.

Upon receiving the PCS brake command, the brake ECU 30 controls the brake actuator 32 so that a deceleration of the own vehicle 12 becomes the PCS required deceleration Gpcs. As a result, frictional braking forces are generated on the front and rear wheels without requiring the driver to operate the brake pedal, and the own vehicle can be forcibly decelerated. As described above, the automatic brake control is a control in which friction braking forces are generated on the front and rear wheels by a PCS brake command to decelerate the own vehicle. Notably, when the vehicle tows a trailer, frictional braking forces may be generated on the left and right wheels of the trailer by a PCS brake command to decelerate the trailer.

The collision avoidance support ECU 20 determines whether or not the collision prediction time TTC becomes larger than an end threshold value TTCb (a positive constant larger than TTCw) by the automatic brake control. Since the end threshold TTCb is larger than TTCw, it is a value larger than the operating threshold TTCa. Therefore, the collision avoidance support ECU 20 monitors whether or not the possibility of collision between the own vehicle 12 and the obstacle is low (whether or not the collision can be avoided). When the collision avoidance support ECU 20 determines that the possibility of collision between the own vehicle and the obstacle is low, the collision avoidance support ECU terminates the transmission of the PCS brake command. As a result, the automatic brake control terminates and the PCS control terminates. Further, the collision avoidance support ECU 20 terminates the transmission of the PCS brake command when the own vehicle is stopped by the automatic brake control. As a result, the automatic brake control terminates.

The collision avoidance support ECU 20 transmits a stop holding command to the brake ECU 30 after the automatic brake control is completed. While receiving the stop holding command, the brake ECU 30 controls the brake actuator 32 to supply a hydraulic pressure set for a stop holding to the wheel cylinders of the friction brake mechanism 34 of the left and right front and rear wheels. As a result, a stopped state of the own vehicle is maintained so that the own vehicle does not move forward or backward (stop holding control). The collision avoidance support ECU 20 stops the transmission of the stop holding command when a cancellation condition of the stop holding control is satisfied. Thus, the supply of the hydraulic pressure to each wheel cylinder is terminated, and the stop holding state of the own vehicle is released.

The release condition of the stop holding control is satisfied when either a release condition 1 or a release condition 2 is satisfied. For example, the release condition 1 is that a duration of the stop holding state of the own vehicle reaches a set time, and the release condition 2 is that a depressing operation of the brake pedal is detected.

The collision avoidance support ECU 20 terminates a driving force limit command for limiting an engine output torque (for example, making the engine output torque zero) to the engine ECU 40 while the automatic brake control is being executed and the own vehicle is held in the stopped state. Therefore, even if the driver operates an accelerator pedal while the automatic brake control is being executed, a driving force required by the driver is ignored, and the own vehicle does not accelerate according to the accelerator pedal operation. The control for holding the own vehicle in the stopped state is referred to as a stop holding control.

<PCS Control Routine>

Figure 5:
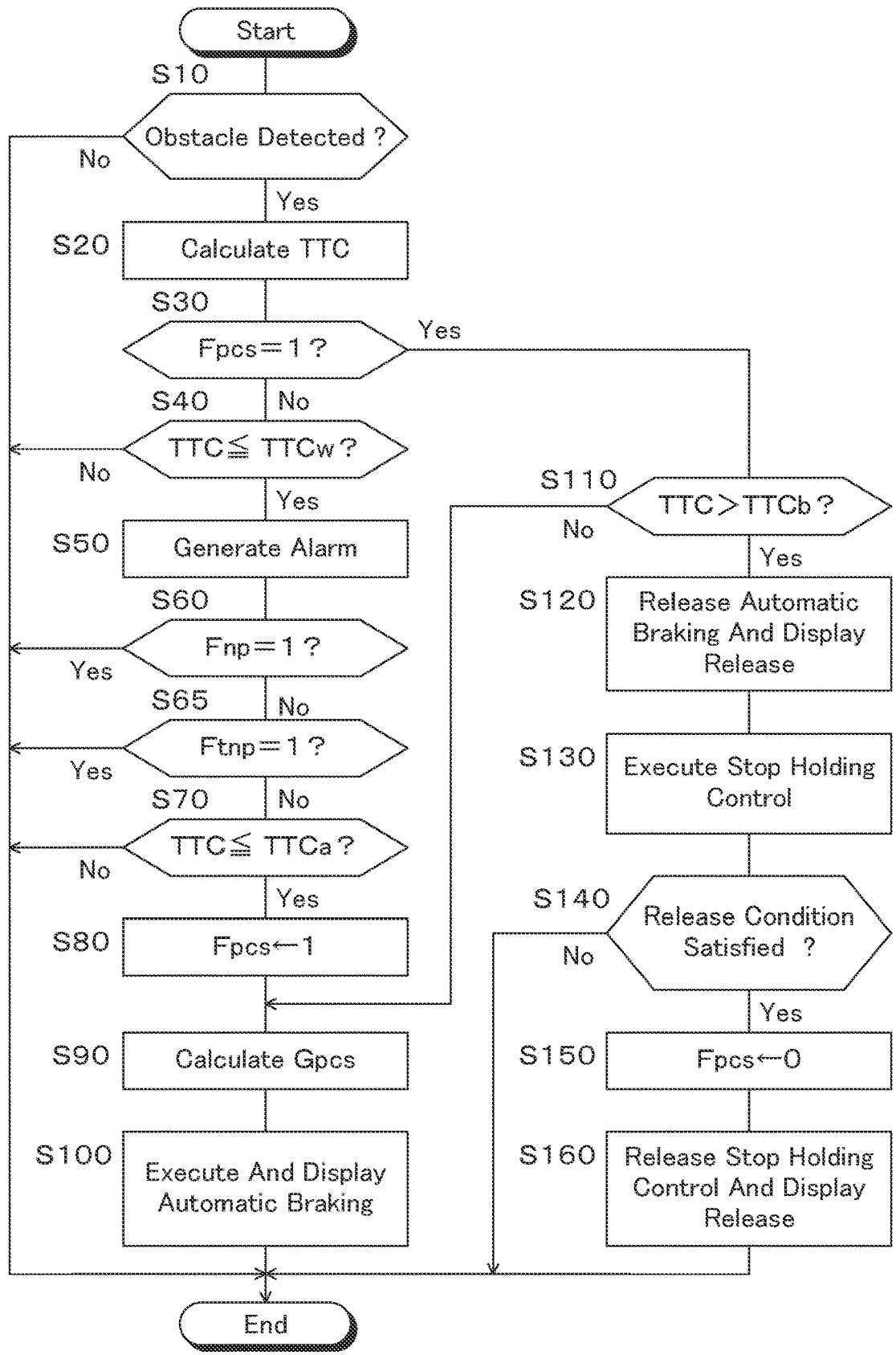
FIG. 5 is a flowchart showing a PCS control routine in the embodiment.

Next, the PCS control routine in the embodiment will be described with reference to the flowchart shown in FIG. 5. The control according to the flowchart shown in FIG. 5 is repeatedly executed by the CPU of the collision avoidance support ECU 20 at predetermined time intervals when an ignition switch (not shown) is on.

First, in step S10, the CPU determines whether or not the obstacle detection device 60 has detected an obstacle in front of the vehicle 12. When a negative determination is made, the CPU temporarily terminates the PCS control, and when an affirmative determination is made, in step S20 the CPU calculates a collision prediction time TTC as described above.

In step S30, the CPU determines whether or not a flag Fpcs is 1, that is, whether or not the automatic brake control by the PCS control is being executed. When an affirmative determination is made, the CPU advances the PCS control to step S110, and when a negative determination is made, the CPU advances the PCS control to step S40. The flag Fpcs is initialized to 0 prior to step S10 at the start of control according to the flowchart shown in FIG. 5.

In step S40, the CPU determines whether or not the collision prediction time TTC is equal to or smaller than the alarm threshold value TTCw, that is, whether or not it is necessary to generate an alarm. When a negative determination is made, the CPU temporarily terminates the PCS control, and when an affirmative determination is made, in step S50 the CPU activates the alarm device 90 to generate an alarm that the vehicle may collide with the obstacle.

In step S60, the CPU determines whether or not a flag Fnp is 1, that is, whether or not the execution of the automatic brake control by the PCS control is prohibited in a situation where the vehicle 12 is not towing a trailer. When an affirmative determination is made, the CPU temporarily terminates the PCS control, and when a negative determination is made, the CPU advances the PCS control to step S65. When an affirmative determination is made in this step or in step S65 described later, step S100 described later is not executed. Therefore, if the automatic brake control by PCS control has already been executed, the automatic brake control is finished.

In step S65, the CPU determines whether or not the flag Ftnp is 1, that is, whether or not the execution of the automatic brake control by the PCS control is prohibited in the situation where the vehicle 12 is towing a trailer. When an affirmative determination is made, the CPU temporarily terminates the PCS control, and when a negative determination is made, the CPU advances the PCS control to step S70.

In step S70, the CPU determines whether or not the collision prediction time TTC is equal to or smaller than the operating threshold value TTCa, that is, whether or not the automatic brake control is necessary. When a negative determination is made, the CPU temporarily terminates the PCS control, and when an affirmative determination is made, in step S80 the CPU sets the flag Fpcs to 1.

In step S90, the CPU calculates a PCS required deceleration Gpcs as described above, and in step S100, the CPU issues a PCS brake command to the brake ECU 30 to change a deceleration of the vehicle 12 to the PCS required deceleration Gpcs. Therefore, the brake actuator 32 is controlled by the brake ECU 30 so that the deceleration of the vehicle 12 becomes the PCS required deceleration Gpcs. Further, the CPU displays on the display 52 that the automatic brake control is being executed.

In step S110, the CPU determines whether or not the collision prediction time TTC is larger than the end threshold value TTCb. When a negative determination is made, the CPU advances the PCS control to step S90, and when an affirmative determination is made, the CPU advances the PCS control to step S120.

In step S120, the CPU releases the automatic brake control and displays on the display 52 that the automatic brake control has been released, and in step S130, the CPU executes the stop holding control as described above. If the automatic brake control is already released, step S120 is skipped.

In step S140, the CPU determines whether or not the above-mentioned release condition 1 or 2 of the stop holding control is satisfied. When a negative determination is made, the CPU temporarily terminates the PCS control, and when an affirmative determination is made, the CPU resets the flag Fpcs to 0 in step S150, releases the alarm and the stop holding control in step S160, and displays on the display 52 that the stop holding control has been released.

<Non-Execution Control Routine of Automatic Brake Control>

Figure 6:
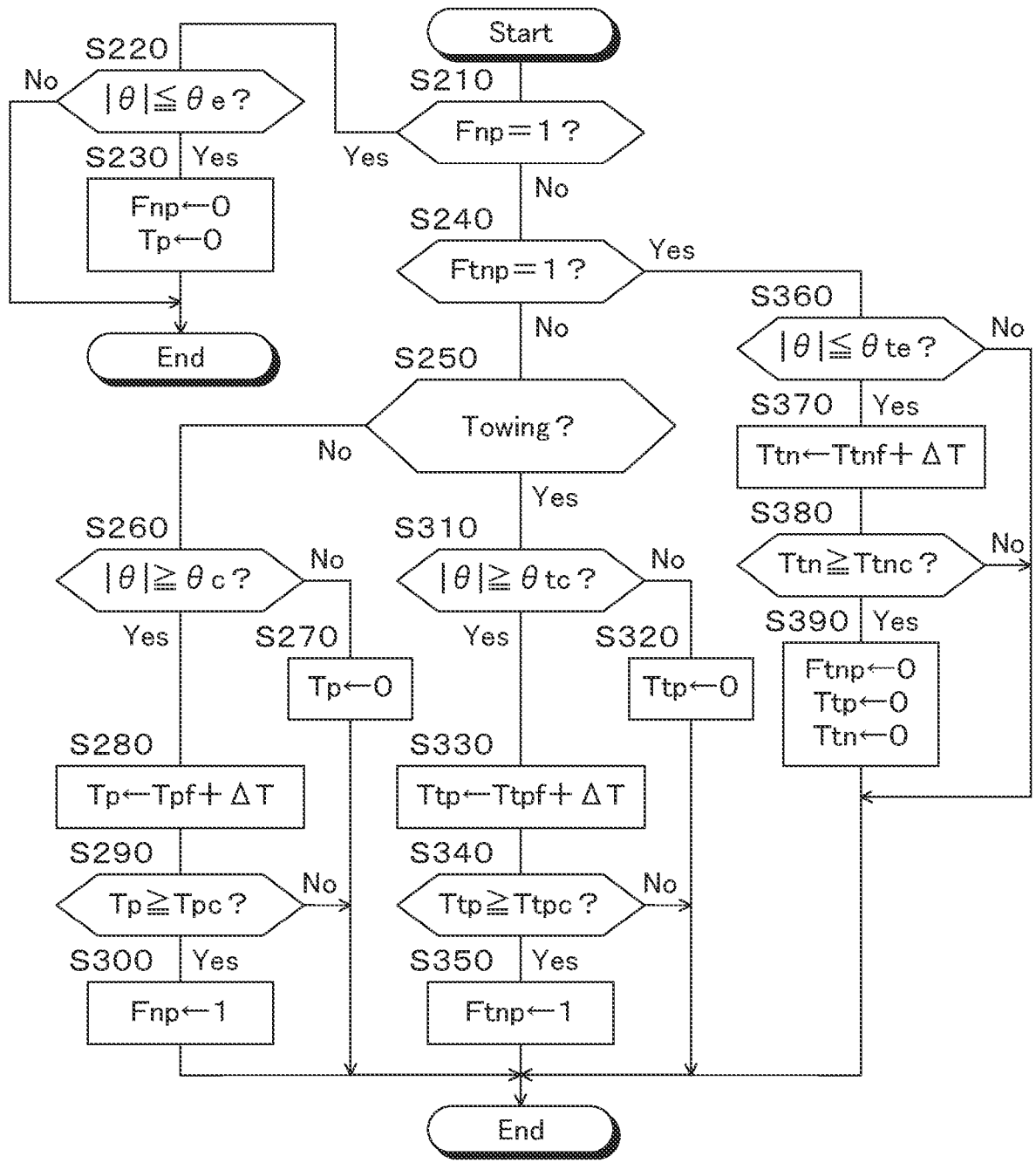
FIG. 6 is a flowchart showing a non-execution control routine of an automatic brake control by the PCS control in the embodiment.

Next, the non-execution control routine of the automatic brake control by the PCS control in the embodiment will be described with reference to the flowchart shown in FIG. 6. The control according to the flowchart shown in FIG. 6 is repeatedly executed by the CPU of the collision avoidance support ECU 20 at predetermined time intervals when the ignition switch (not shown) is on. In the following description, the non-execution control of the automatic brake control according to the flowchart shown in FIG. 6 is simply referred to as "non-execution control". The flags Fnp, Ftnp and timer count values Tp, Ttp, and Ttn are initialized to 0 at the start of the non-execution control according to the flowchart shown in FIG. 6.

First, in step S210, the CPU determines whether or not the flag Fnp is 1, that is, whether or not the automatic brake control by the PCS control is already prohibited in a situation where the vehicle 12 is not towing a trailer 102. When a negative determination is made, the CPU advances the non-execution control to step S240, and when an affirmative determination is made, the CPU advances the non-execution control to step S220.

In step S220, the CPU determines whether or not an absolute value of the steering angle $\theta$ detected by the steering angle sensor is equal to or smaller than a reference value ee (a positive constant). In this embodiment, the steering angle $\theta$ is a turning index value of the vehicle 12, and the larger the absolute value of the steering angle $\theta$, the higher a degree of turning of the vehicle. When a negative determination is made, the CPU temporarily terminates the non-execution control, and when an affirmative determination is made, in step S230 the CPU resets the flag Fnp to 0 and resets the timer count value Tp to 0.

In step S240, the CPU determines whether the flag Ftnp is 1, that is, whether the automatic brake control by the PCS control is already prohibited in the situation where the vehicle 12 is towing a trailer 102. When an affirmative determination is made, the CPU advances the non-execution control to step S360, and when a negative determination is made, the CPU advances the non-execution control to step S250.

In step S250, the CPU determines whether or not the vehicle 12 is towing the trailer based on a detection result of the traction sensor 92. When an affirmative determination is made, the CPU advances the non-execution control to step S310, and when a negative determination is made, the CPU advances the non-execution control to step S260.

In step S260, the CPU determines whether or not an absolute value of the steering angle $\theta$ is equal to or larger than a reference value $\theta c$ (a positive constant larger than $\theta e$) which is a first reference value. When a negative determination is made, the CPU resets the timer count value Tp to 0 in step S270, then temporarily terminates the non-execution control, and when an affirmative determination is made, the CPU advances the non-execution control to step S280.

In step S280, the CPU updates the timer count value Tp to Tpf+ΔT, with Tpf as a previous value of the timer count value Tp and ΔT as a cycle time of the flowchart shown in FIG. 6.

In step S290, the CPU determines whether or not the timer count value Tp equal to or larger than a reference value Tpc (a positive constant of about 0.5 seconds). When a negative determination is made, the CPU temporarily terminates the non-execution control, and when an affirmative determination is made, in step S300 the CPU sets the flag Fnp to 1.

In step S310, the CPU determines whether or not an absolute value of the steering angle θ is equal to or larger than a reference value θtc (a positive constant smaller than θc) which is a second reference value. When a negative determination is made, the CPU resets the timer count value Ttp to 0 in step S320, then temporarily terminates the non-execution control, and when an affirmative determination is made, the CPU advances the non-execution control to step S330.

In step S330, the CPU updates the timer count value Ttp to Ttpf+ΔT, with Ttpf as a previous value of the timer count value Ttp.

In step S340, the CPU determines whether or not the timer count value Ttp is equal to or larger than a reference value Ttpc (a positive constant of about 0.5 seconds). When a negative determination is made, the CPU temporarily terminates the non-execution control, and when an affirmative determination is made, in step S350 the CPU sets the flag Ftnp to 1.

In step S360, the CPU determines whether or not an absolute value of the steering angle θ is equal to or smaller than a reference value θte (a positive constant smaller than θe and θtc) which is a third reference value. When a negative determination is made, the CPU temporarily terminates the non-execution control, and when an affirmative determination is made, the CPU advances the non-execution control to step S370.

In step S370, the CPU updates the timer count value Ttn to Ttnf+ΔT, with Ttnf as a previous value of the timer count value Ttn.

In step S380, the CPU determines whether or not the timer count value Ttn is equal to or larger than a reference value Ttnc (a positive constant of about 3 seconds). When a negative determination is made, the CPU temporarily terminates the non-execution control, and when an affirmative determination is made, in step S390 the CPU resets the flag Ftnp to 0 and resets the timer count values Ttp and Ttn to 0.

First Modification

Figure 7:
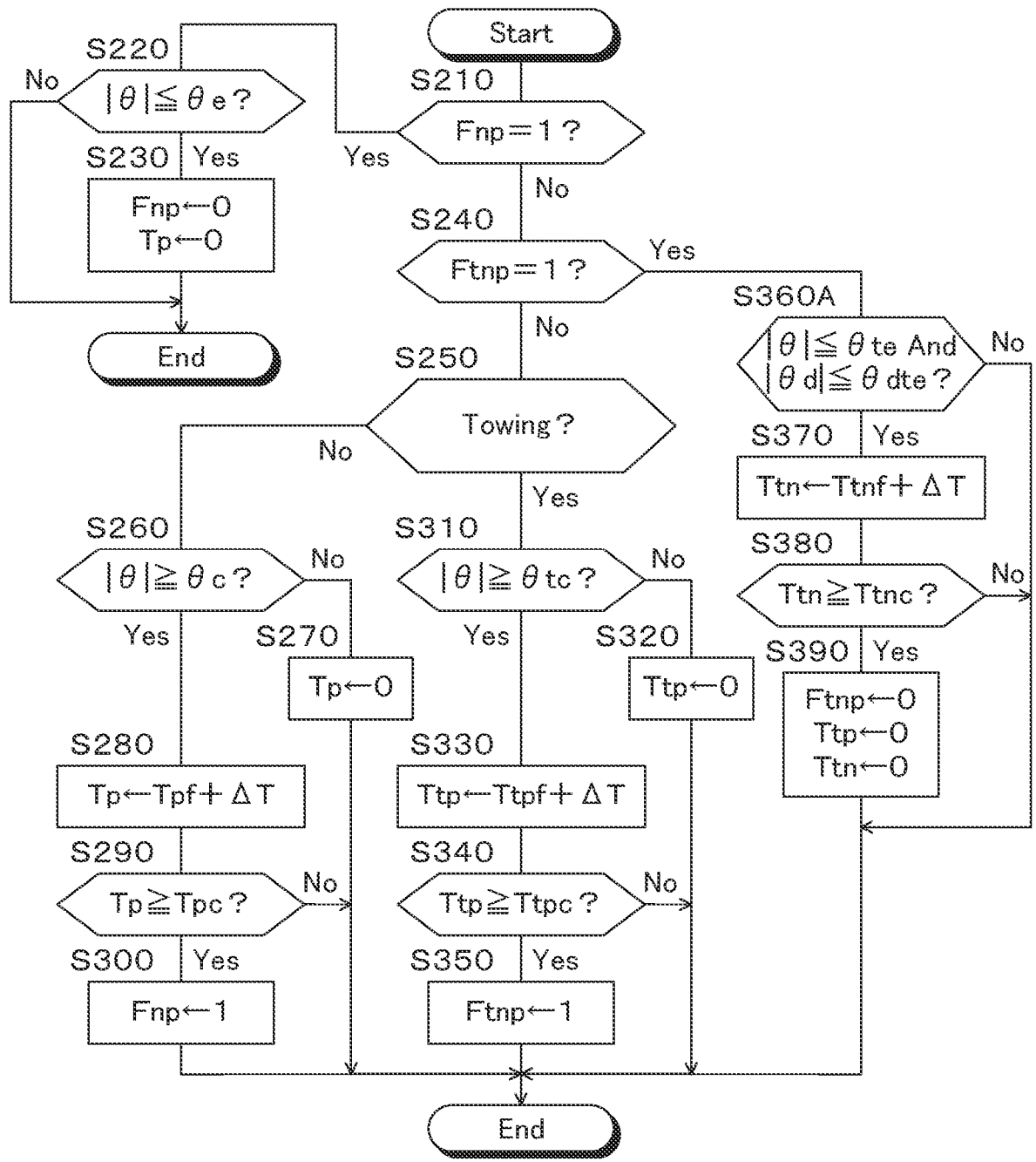
FIG. 7 is a flowchart showing a non-execution control routine of the automatic brake control by the PCS control in a first modification.

FIG. 7 is a flowchart showing a non-execution control routine of the automatic brake control by the PCS control in the first modification. In FIG. 7, the same steps as the steps shown in FIG. 6 are assigned the same step numbers as the step numbers assigned in FIG. 6. This also applies to FIGS. 8 and 9 described later.

In the first modification, step S360A is executed instead of step S360 in the embodiment. Other points of this modification are the same as those of the embodiment.

In step S360A, the CPU determines whether or not an absolute value of a steering angle θ is equal to or smaller than the reference value θte and an absolute value of a time derivative value (steering angular velocity) θd of the steering angle θ is equal to or smaller than a reference value θdte (a positive constant). When a negative determination is made, the CPU temporarily terminates the non-execution control, and when an affirmative determination is made, the CPU advances the non-execution control to step S370.

Therefore, in the first modification, when the predetermined time Ttnc has elapsed from a time point when the condition that an absolute value of the steering angle θ is equal to or smaller than the reference value θte and an absolute value of the time derivative θd of the steering angle θ is equal to or smaller than the reference value θdte is satisfied, the flag Ftnp is reset to 0, and the prohibition of the automatic brake control is released.

Second Modification

Figure 8:
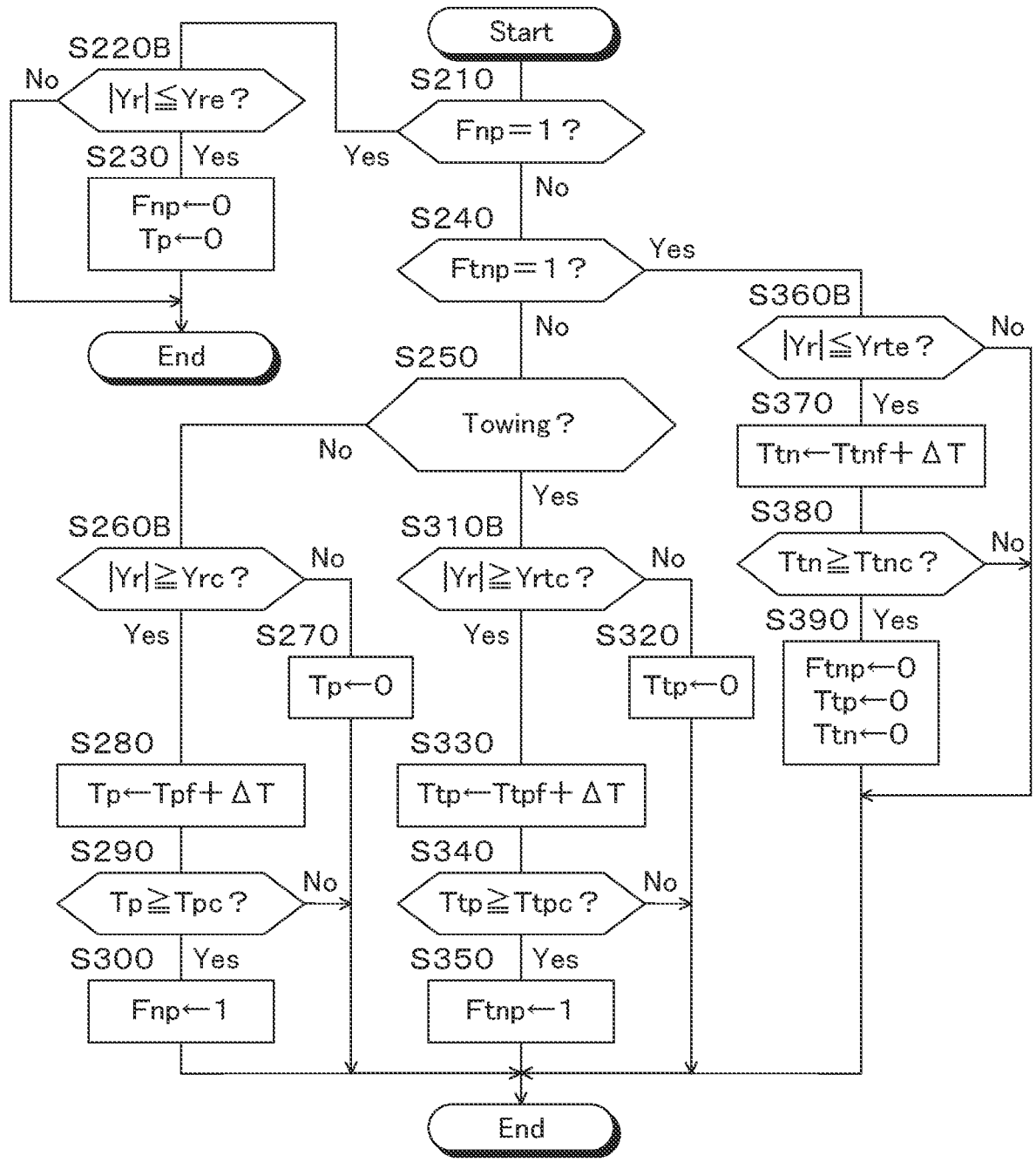
FIG. 8 is a flowchart showing a non-execution control routine of the automatic brake control by the PCS control in a second modification.

FIG. 8 is a flowchart showing a non-execution control routine of the automatic brake control by the PCS control in the second modification.

In the second modification, the turning index value of the vehicle 12 is a yaw rate Yr of the vehicle. Therefore, in step S220B, the CPU determines whether or not an absolute value of the yaw rate Yr of the vehicle detected by the yaw rate sensor is equal to or smaller than a reference value Yre (a positive constant). In step S260B, the CPU determines whether or not an absolute value of the yaw rate Yr of the vehicle is equal to or larger than a reference value Yrc (a positive constant larger than Yre) which is a first reference value.

In step S310B, the CPU determines whether or not an absolute value of the yaw rate Yr of the vehicle is equal to or larger than a reference value Yrtc (a positive constant smaller than Yrc) which is a second reference value. In step S360B, the CPU determines whether or not an absolute value of the yaw rate Yr of the vehicle is equal to or smaller than a reference value Yrte (a positive constant smaller than Yre and Yrtc) which is a third reference value.

Third Modification

Figure 9:
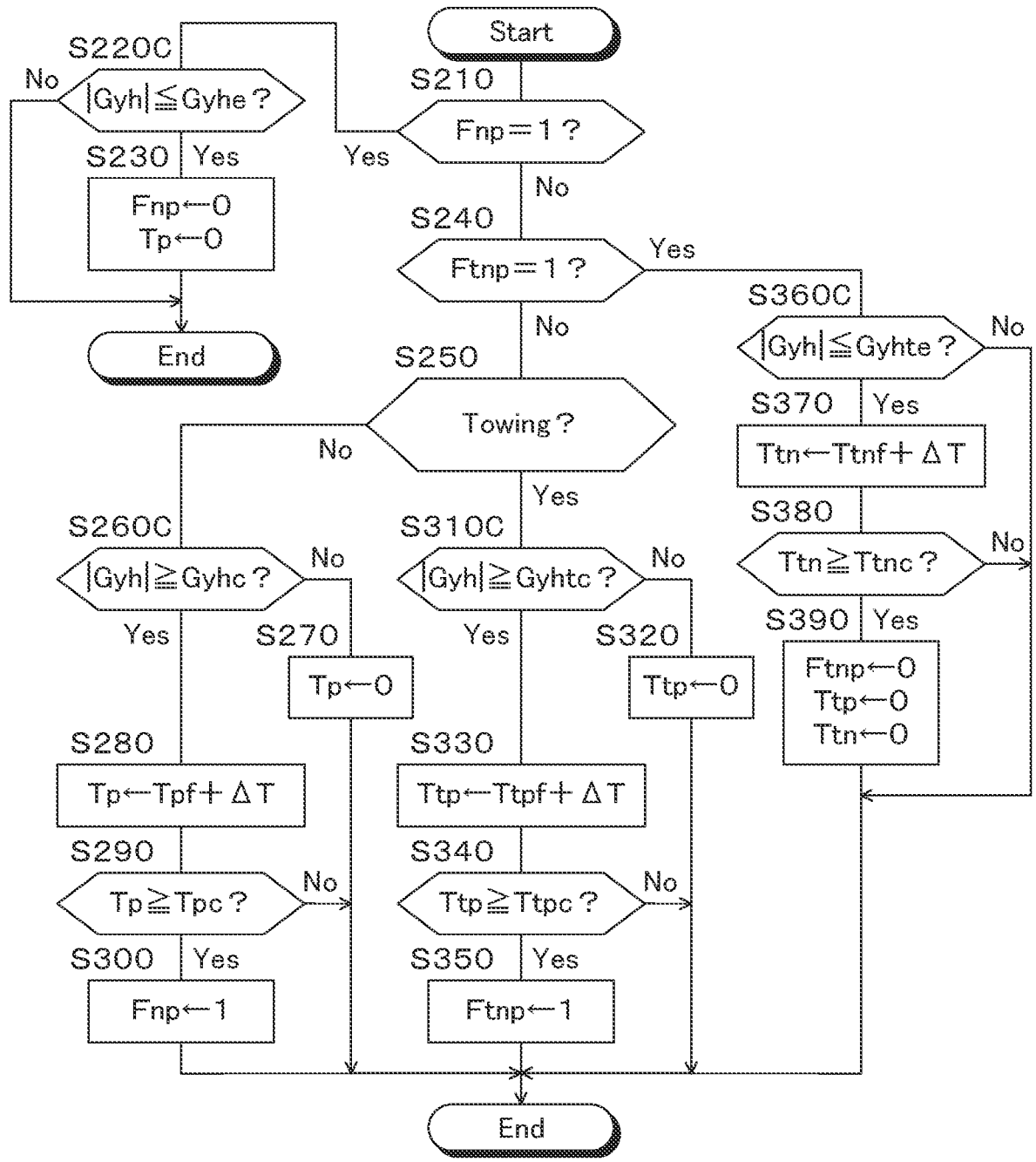
FIG. 9 is a flowchart showing a non-execution control routine of the automatic brake control by the PCS control in a third modification.

FIG. 9 is a flowchart showing a non-execution control routine of the automatic brake control by the PCS control in the third modification.

In the third modification, the turning index value of the vehicle 12 is a product Yr·V of a yaw rate Yr of the vehicle and a vehicle speed V, that is, an estimated lateral acceleration Gyh of the vehicle. Therefore, in step S220C, the CPU determines whether or not an absolute value of the estimated lateral acceleration Gyh of the vehicle is equal to or smaller than a reference value Gyhe (a positive constant). In step S260C, the CPU determines whether or not an absolute value of the estimated lateral acceleration Gyh of the vehicle is equal to or larger than a reference value Gyhc (a positive constant larger than Gyhe) which is a first reference value.

In step S310C, the CPU determines whether or not an absolute value of the estimated lateral acceleration Gyh of the vehicle is equal to or larger than a reference value Gyhtc (a positive constant smaller than Gyhc) which is a second reference value. In step S360C, the CPU determines whether or not an absolute value of the estimated lateral acceleration Gyh of the vehicle is equal to or smaller than a reference value Gyhte (a positive constant smaller than Gyhe and Gyhtc) which is a third reference value.

As can be seen from the above descriptions, according to the embodiment and the first to third modifications, when an obstacle is detected in front of the vehicle 12 by the obstacle detection device 60 (step S10), warning is executed as necessary by the PCS control. That is, when a collision prediction time TTC is calculated (step S20) and the collision prediction time TTC is equal to or smaller than the warning threshold TTCw (step S40), the warning device 94 is activated to generate an alarm to the effect that the vehicle may collide with the obstacle (step S50). Since the warning is also issued when the vehicle 12 is towing a trailer, it is possible to call attention that the vehicle may collide with an obstacle, and a driver can perform collision avoidance steering as necessary.

As described above, when the flags Fnp and Ftnp are 0 (steps S60 and S65), the automatic brake control by the PCS control (steps S70 to S100) is executed as needed. That is, when the collision prediction time TTC is equal to or smaller than the operating threshold value TTCa (step S70), the required deceleration Gpcs for avoiding the vehicle 12 from colliding with an obstacle is calculated (step S90), and the automatic brake control is executed so that the deceleration of the vehicle 12 becomes the PCS required deceleration Gpcs (step S100). Therefore, even when the vehicle 12 is towing a trailer, it is possible to prevent the vehicle from colliding with an obstacle by the automatic brake control.

Further, when the flag Ftnp is 1 (step S65), the automatic brake control by the PCS control (steps S70 to S100) is not executed. Therefore, when the vehicle 12 is towing a trailer and there is a possibility that a jackknifing phenomenon may occur, the automatic brake control is not executed, so that it is possible to prevent the jackknifing phenomenon from occurring due to the automatic brake control.

Further, according to the embodiment and the first to third modifications, in a situation where the vehicle 12 is not towing a trailer, when it is determined that the turning index value of the vehicle is equal to or larger than the first reference value, the automatic brake control is prohibited. On the other hand, in the situation where the vehicle is towing a trailer, when it is determined that the turning index value of the vehicle is equal to or larger than the second reference value, the automatic brake control is prohibited. The second reference value is smaller than the first reference value.

Therefore, when the vehicle is towing a trailer, the automatic brake control is prohibited from a stage where the turning index value of the vehicle is small as compared to where the vehicle is not towing a trailer. Accordingly, when the vehicle is turning, it is possible to avoid a jackknifing phenomenon caused by the deceleration of the vehicle due to the automatic brake control from a stage where the turning index value of the vehicle is small.

Further, according to the embodiment and the second and third modifications, the prohibition of the automatic brake control is continued until a predetermined time elapses from a time point when it is determined that the turning index value becomes equal to or smaller than a third reference value smaller than the second reference value from a value larger than the third reference value, and the prohibition of the automatic brake control is released after the predetermined time has elapsed from the above time point. Therefore, in a situation where the vehicle has finished turning but the trader is in a turning state, it is possible to prevent the jackknifing phenomenon from occurring due to the automatic brake control.

In particular, according to the first modification, the prohibition of the automatic brake control is released when the predetermined time Ttnc has elapsed from a time point where the condition that an absolute value of the steering angle θ is equal to or smaller than the reference value θte and an absolute value of the time derivative value (steering angular velocity) θd of the steering angle θ is equal to or smaller than the reference value θdte is satisfied. The absolute value of the time derivative θd of the steering angle θ generally becomes equal to or smaller than the reference value θdte after the absolute value of the steering angle θ becomes equal to or smaller than the reference value θte. Therefore, according to the first modification, the prohibition of the automatic brake control is continued for a longer time as compared to the embodiment, and it is possible to reduce the possibility that the prohibition of the automatic brake control is released before a trailer goes straight.

Further, according to the first modification, not only when the turning of the vehicle 12 is completed but also when the vehicle 12 changes lanes and an absolute value of the steering angle θ becomes equal to or smaller than the reference value θte during the lane change, the prohibition of the automatic brake control can be continued. Therefore, when the vehicle 12 changes lanes, it is possible to reduce the possibility that a jackknifing phenomenon occurs due to the automatic brake control.

Further, according to the embodiment and the first modification, since the turning index value is a steering angle θ, it is possible to control the prohibition of the automatic brake control based on the steering angle detected as a steering operation amount of a driver.

Further, according to the second modification, it is possible to control the prohibition of the automatic brake control based on a yaw rate Yr of the vehicle detected as one of the turning state quantities of the vehicle.

Further, according to the third modification, it is possible to control the prohibition of the automatic brake control based on a product Yr·V of a vehicle speed V and a yaw rate Yr of the vehicle detected as one of the turning state quantities of the vehicle, that is, an estimated lateral acceleration Gyh of the vehicle.

Although the present disclosure has been described in detail with reference to the specific embodiment and the first to third modifications, it will be apparent to those skilled hi the art that the present disclosure is not limited to the above-described embodiment and the first to third modifications, and various other embodiments are possible within the scope of the present disclosure.

Figure 10:
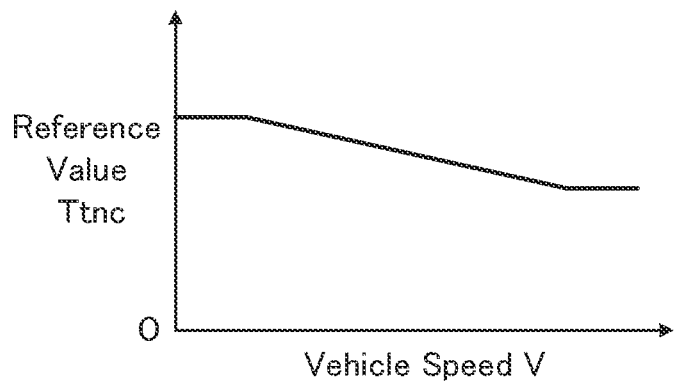
FIG. 10 is a map for calculating a reference value Ttnc based on a vehicle speed V.

For example, in the above-described embodiment and the first to third modifications, the reference value Ttnc used for the determination in step S380 is a positive constant. However, a time for a trailer to continue a turning state even after the vehicle finishes turning is shorter as a vehicle speed V is higher. Therefore, in embodiments the predetermined time during which the prohibition of the automatic brake control is continued from a time point when it is determined that the turning index value becomes smaller than the third reference value from the third reference value smaller than the second reference value is variably set according to a vehicle speed so that the higher the vehicle speed, the shorter the predetermined time. Accordingly, as shown in FIG. 10, the reference value Ttnc may variably be set according to a vehicle speed V so that the higher the vehicle speed, the smaller the reference value.

According to this aspect, the predetermined time Ttnc is variably set according to the vehicle speed so that the higher the vehicle speed V, the shorter the predetermined time. Therefore, while preventing the automatic brake control from being restarted in spite the trailer is still in the turning state when the vehicle speed is low, it is possible to prevent the prohibition of the automatic brake control from being continued unnecessarily for a long time when the vehicle speed is high.

Further, in the above-described embodiment and the first to third modifications, the vehicle 12 has a traction sensor 92, and in step S210, it is determined whether or not the vehicle 12 is towing a trailer based on the detection result of the traction sensor 92. However, whether or not the vehicle is towing a trailer may be determined based on the information behind the vehicle taken by a back camera. Alternatively, a weight of the vehicle may be estimated based on a relationship between a braking force of the vehicle and a deceleration, and it may be determined whether or not the estimated weight is larger than a weight of the vehicle alone. Further, these determinations may be combined.

Further, in the above-described embodiment and the first to third modifications, the trailer 102 includes the brake ECU 104, the brake actuator 108, and the friction brake mechanism 112. However, the collision avoidance support device and the collision avoidance support program of the present disclosure may be applied to a vehicle towing a trailer that is not provided with a brake ECU and the like.

Further, in the above-described embodiment and the first to third modifications, the stop holding control is performed in the collision avoidance support control. However, when an affirmative determination is made in step S110, steps S120 and S150 may be executed without executing steps S130, S140 and S160.

What is claimed is:

1. A collision avoidance support device for a vehicle that includes an obstacle detection device that detects an obstacle in front of a vehicle and an electronic control unit configured to perform automatic brake control to apply braking force automatically to the vehicle when it is determined that an obstacle is detected by the obstacle detection device and the vehicle may collide with the obstacle, wherein the electronic control unit is configured to prohibit the automatic brake control when it is determined that the vehicle is not towing a trailer and a turning index value indicating a degree of turning of the vehicle is equal to or higher than a first reference value, and prohibit the automatic brake control when it is determined that the vehicle is towing a trailer and the turning index value is equal to or larger than a second reference value smaller than the first reference value, and wherein the electronic control unit is configured to continue the prohibition of the automatic brake control until a predetermined time elapses from a time point when it is determined that the turning index value becomes equal to or smaller than a third reference value smaller than the second reference value from a value larger than the third reference value, and release the prohibition of the automatic brake control after the predetermined time has elapsed from the above time point.

2. The collision avoidance support device for a vehicle according to claim 1, wherein the electronic control unit is configured to variably set the predetermined time according to a vehicle speed so that the higher the vehicle speed, the shorter the predetermined time.

3. The collision avoidance support device for a vehicle according to claim 1, wherein the turning index value is a steering angle.

4. The collision avoidance support device for a vehicle according to claim 1, wherein the turning index value is a yaw rate of the vehicle.

5. The collision avoidance support device for a vehicle according to claim 1, wherein the turning index value is a product of a yaw rate of the vehicle and a vehicle speed.

6. The collision avoidance support device for a vehicle according to claim 1, wherein the turning index value is a steering angle, and the electronic control unit is configured to continue the prohibition of the automatic brake control until a predetermined time elapses from a time point when it is determined that a condition that an absolute value of a steering angle is smaller than or equal to the third reference value smaller than the second reference value and an absolute value of a time derivative of the steering angle is smaller than or equal to a reference value of the time derivative is satisfied, and release the prohibition of the automatic brake control after the predetermined time has elapsed from the above time point.

7. A non-transitory computer readable storage medium storing a collision avoidance support program for a vehicle that causes an electronic control unit mounted on a vehicle to execute a step of detecting an obstacle in front of the vehicle by an obstacle detection device and a step of performing automatic brake control that automatically applies braking force to the vehicle when it is determined that an obstacle is detected by the obstacle detection device and the vehicle may collide with the obstacle, wherein the collision avoidance support program includes a step of determining whether the vehicle is towing a trailer, a step of prohibiting the automatic brake control when it is determined that the vehicle is not towing a trailer and a turning index value indicating a degree of turning of the vehicle is equal to or larger than a first reference value, and a step of prohibiting the automatic brake control when it is determined that the vehicle is towing a trailer and the turning index value is equal to or larger than a second reference value smaller than the first reference value, and wherein the collision avoidance support program includes a step of continuing the prohibition of the automatic brake control until a predetermined time elapses from a time point when it is determined that the turning index value becomes equal to or smaller than a third reference value smaller than the second reference value from a value larger than the third reference value, and a step of releasing the prohibition of the automatic brake control after the predetermined time has elapsed from the above time point.

* * * * *